US009983767B2

(12) United States Patent
Kim et al.

(10) Patent No.: US 9,983,767 B2
(45) Date of Patent: May 29, 2018

(54) APPARATUS AND METHOD FOR PROVIDING USER INTERFACE BASED ON HAND-HELD POSITION OF THE APPARATUS

(71) Applicant: Samsung Electronics Co., Ltd., Suwon-si, Gyeonggi-do (KR)

(72) Inventors: Ho Kim, Seoul (KR); Zion Kwon, Seoul (KR); Hyewon Kim, Seoul (KR); Jungeui Seo, Anyang-si (KR); Changmo Yang, Anyang-si (KR); Hayoung Jeon, Seoul (KR); Jinkyo Chung, Seoul (KR); Bonghak Choi, Goyang-si (KR); Joonhyuk Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 14/705,293

(22) Filed: May 6, 2015

(65) Prior Publication Data

US 2015/0324070 A1    Nov. 12, 2015

(30) Foreign Application Priority Data

May 8, 2014    (KR) ........................ 10-2014-0054609

(51) Int. Cl.
*G06F 3/048* (2013.01)
*G06F 3/0482* (2013.01)
*G06F 3/041* (2006.01)
*G06F 3/0488* (2013.01)
*G06F 1/16* (2006.01)

(52) U.S. Cl.
CPC .......... *G06F 3/0482* (2013.01); *G06F 1/1643* (2013.01); *G06F 1/1694* (2013.01); *G06F 3/0416* (2013.01); *G06F 3/0488* (2013.01); *G06F 2200/1637* (2013.01)

(58) Field of Classification Search
CPC .... G06F 3/0482; G06F 3/0416; G06F 3/0488; G06F 1/16443; G06F 1/1694
See application file for complete search history.

(56) References Cited

U.S. PATENT DOCUMENTS

| 8,760,426 B1* | 6/2014 | Strand | G09G 5/00 345/169 |
|---|---|---|---|
| 2003/0112278 A1* | 6/2003 | Driskell | G06F 3/0481 715/788 |
| 2005/0052427 A1* | 3/2005 | Wu | G06F 3/04883 345/173 |
| 2006/0197750 A1* | 9/2006 | Kerr | G06F 1/1626 345/173 |
| 2009/0122022 A1* | 5/2009 | Park | G06F 3/0488 345/173 |

(Continued)

*Primary Examiner* — Dino Kujundzic
(74) *Attorney, Agent, or Firm* — Jefferson IP Law, LLP

(57) ABSTRACT

An electronic apparatus and a method for providing a user interface are provided. The electronic apparatus includes a sensor module configured to detect sensor data, a touch screen configured to display a control menu related to content that is displayed, and a control module configured to determine a hand-held position of the electronic apparatus, based on the sensor data, to configure the control menu, based on the determined hand-held position, and to display the configured control menu, based on the determined hand-held position.

15 Claims, 12 Drawing Sheets

(56) References Cited

U.S. PATENT DOCUMENTS

| | | | | |
|---|---|---|---|---|
| 2009/0160792 A1* | 6/2009 | Morohoshi | G06F 1/1626 | 345/173 |
| 2010/0053109 A1* | 3/2010 | Narita | G06F 3/042 | 345/173 |
| 2010/0156675 A1* | 6/2010 | Ganey | G06F 3/038 | 341/20 |
| 2010/0192102 A1* | 7/2010 | Chmielewski | G06F 3/04817 | 715/834 |
| 2010/0310136 A1* | 12/2010 | Tsuda | G06F 1/1626 | 382/124 |
| 2011/0148915 A1* | 6/2011 | Kim | G06F 1/1626 | 345/619 |
| 2011/0169760 A1* | 7/2011 | Largillier | G06F 3/04883 | 345/173 |
| 2011/0285645 A1* | 11/2011 | Cho | G06F 3/0416 | 345/173 |
| 2012/0306788 A1* | 12/2012 | Chen | G06F 3/0482 | 345/173 |
| 2012/0306927 A1* | 12/2012 | Lee | G06F 3/041 | 345/660 |
| 2013/0019201 A1* | 1/2013 | Cabrera-Cordon | G06F 3/04883 | 715/810 |
| 2013/0212535 A1* | 8/2013 | Kim | G06F 3/0482 | 715/841 |
| 2013/0215060 A1* | 8/2013 | Nakamura | G06F 1/1626 | 345/173 |
| 2013/0265235 A1 | 10/2013 | Cai et al. | | |
| 2014/0115545 A1* | 4/2014 | Liu | G06F 3/0488 | 715/863 |
| 2014/0359473 A1* | 12/2014 | Tang | G06F 3/0484 | 715/746 |
| 2015/0091831 A1* | 4/2015 | Nakanishi | G06F 3/04886 | 345/173 |
| 2015/0149941 A1* | 5/2015 | Itagaki | G06F 3/04817 | 715/765 |
| 2016/0162149 A1* | 6/2016 | Lee | G06F 1/1694 | 715/835 |

* cited by examiner

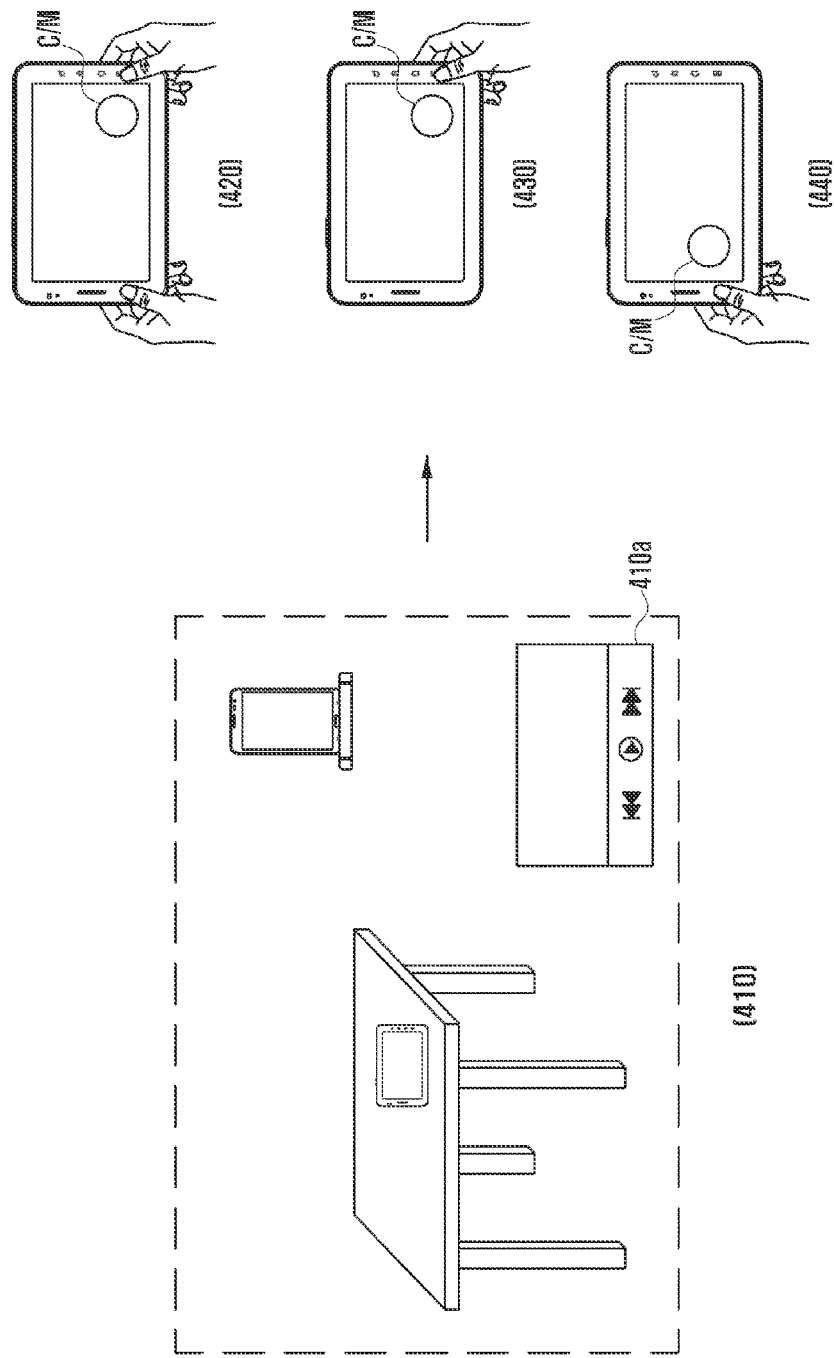

FIG. 5A
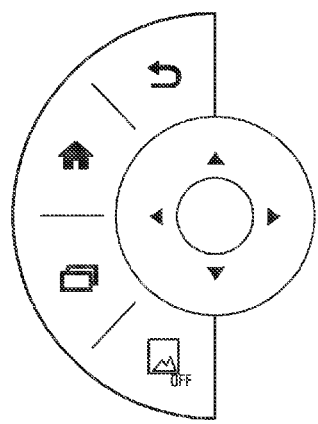
[510]
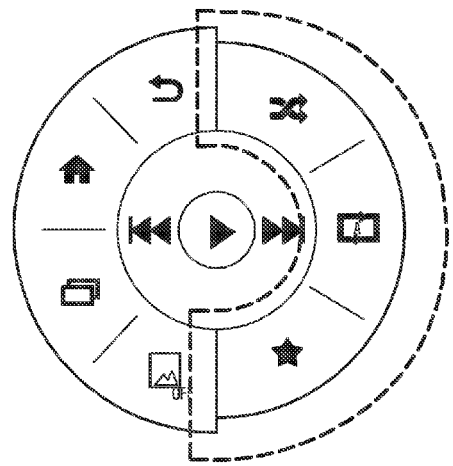
[520]
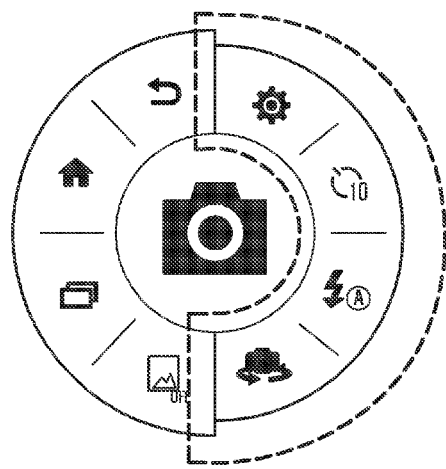
[530]
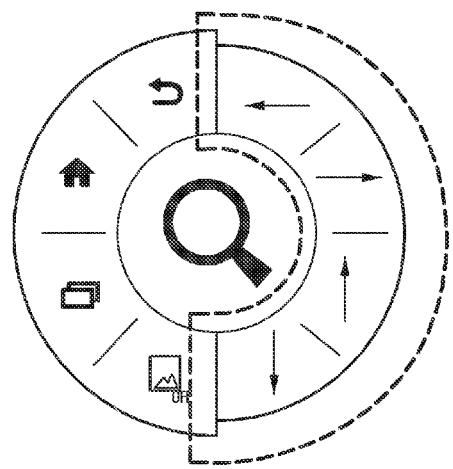
[540]

FIG. 5B
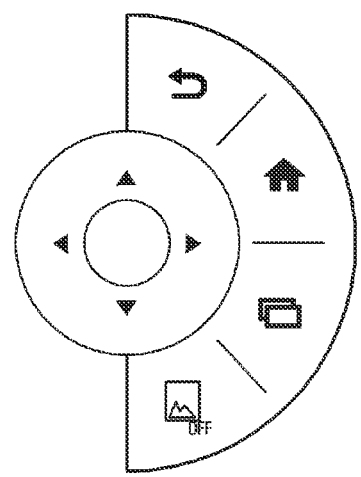
(550)
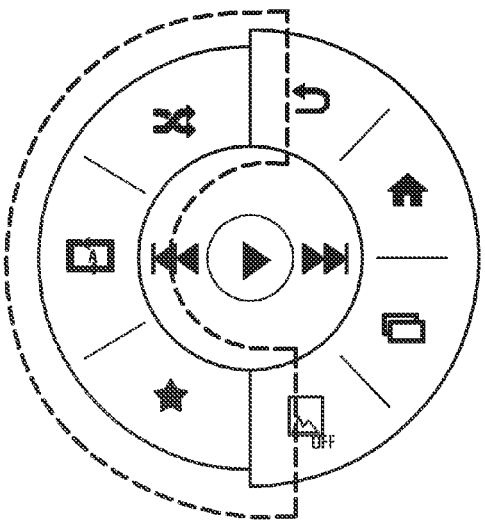
(560)
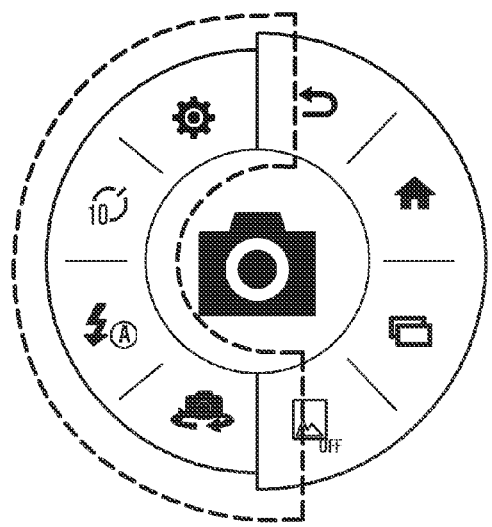
(570)
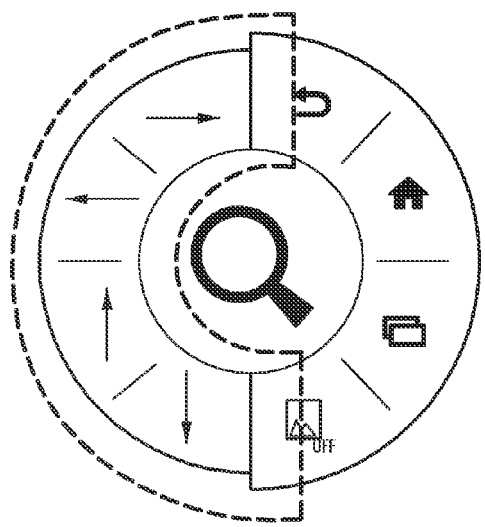
(580)

FIG. 6A
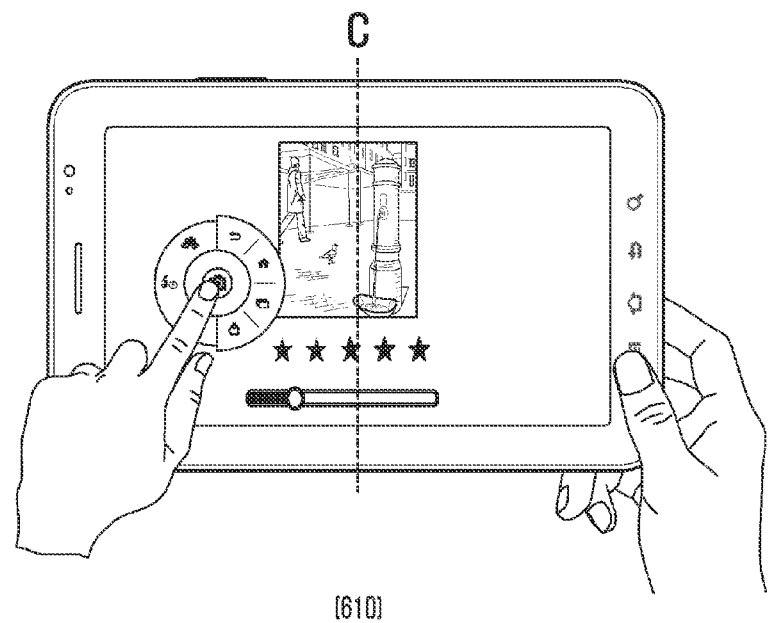
[610]
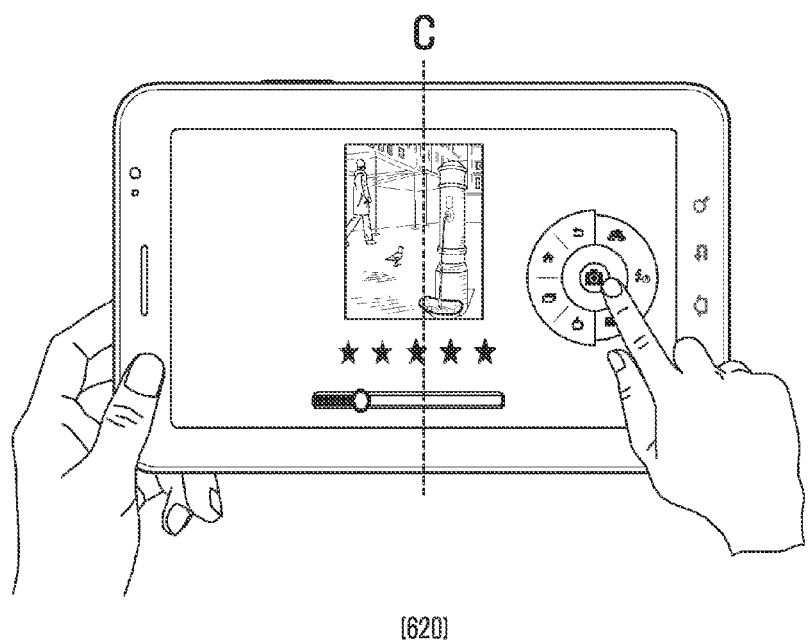
[620]

FIG. 7
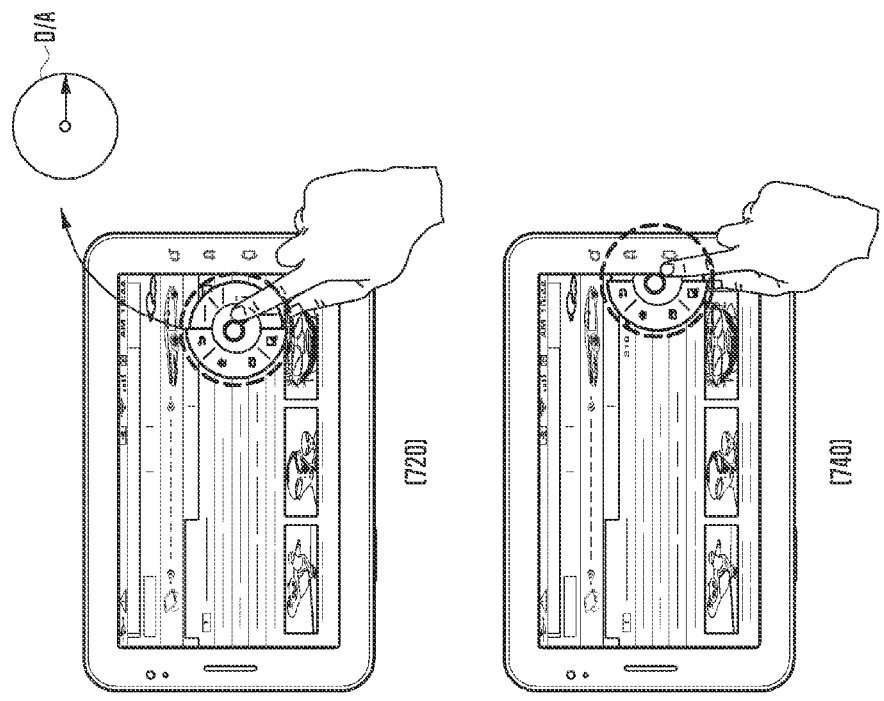
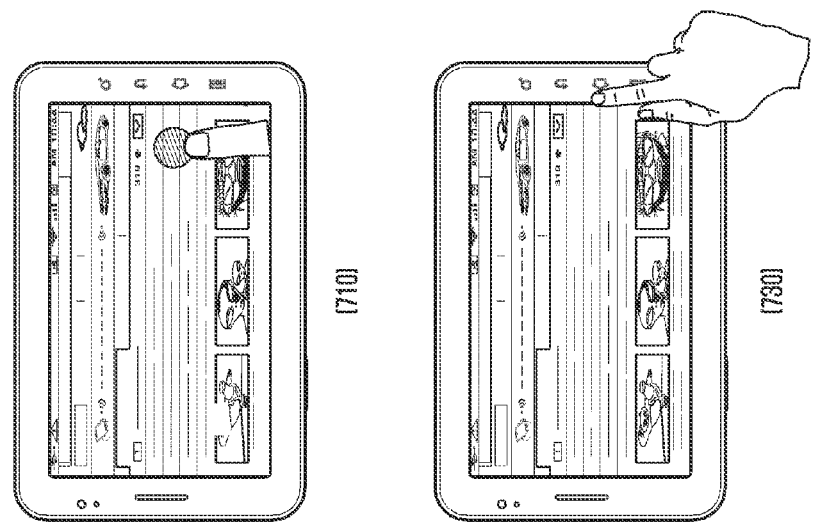

APPARATUS AND METHOD FOR PROVIDING USER INTERFACE BASED ON HAND-HELD POSITION OF THE APPARATUS

CROSS-REFERENCE TO RELATED APPLICATION(S)

This application claims the benefit under 35 U.S.C. § 119(a) of a Korean patent application filed on May 8, 2014 in the Korean Intellectual Property Office and assigned Serial number 10-2014-0054609, the entire disclosure of which is hereby incorporated by reference.

TECHNICAL FIELD

The present disclosure relates to an apparatus and a method for providing a user interface.

BACKGROUND

The development of various functions of portable devices facilitates the ability to provide services, such as word processing, video editing, wireless Internet, or the like, which have been typically provided in notebook computers, as well as the ability to provide basic services such as phone calls, and text messages.

As portable devices provide similar functions to those of notebook computers, the portable devices tend to become larger and heavier. However, user inconvenience due to the increase in the size of the portable device has not been improved, so it is not easy to control these larger and heavier portable devices.

Furthermore, the enlargement of a display of electronic apparatuses creates a weight problem for the electronic apparatuses. For example, a user usually holds the electronic apparatus with one hand and controls the electronic apparatus with the other hand. However, in controlling the electronic apparatus with one hand, the electronic apparatus may be too heavy to be held by the other hand. Furthermore, the electronic apparatus provides only a typical user interface for controlling the electronic apparatus, which causes degradations in user convenience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for providing a user interface.

In accordance with an aspect of the present disclosure, an electronic apparatus is provided. The electronic apparatus includes a sensor module configured to detect sensor data, a touch screen configured to display a control menu related to content that is displayed, and a control module configured to determine a hand-held position of the electronic apparatus, based on the sensor data, to configure the control menu, based on the determined hand-held position, and to control to display the configured control menu, based on the determined hand-held position.

In accordance with another aspect of the present disclosure, a method for providing a user interface in an electronic apparatus adopting a touch screen is provided. The method includes detecting, by the electronic apparatus, sensor data using a sensor, determining a hand-held position of the electronic apparatus, based on the sensor data, configuring a control menu related to content displayed on the touch screen, based on the determined hand-held position, and displaying the configured control menu, based on the determined hand-held position.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 illustrates an example of detecting sensor data according to an embodiment of the present disclosure;

FIG. 5A illustrates an example of configuring a right-hand mode control menu according to an embodiment of the present disclosure;

FIG. 5B illustrates an example of configuring a left-hand mode control menu according to an embodiment of the present disclosure;

FIG. 6A illustrates an example of displaying a control menu according to a hand-held position of an electronic apparatus and a touch position thereof according to an embodiment of the present disclosure;

FIG. 7 illustrates an example of changing a position of a control menu according to an embodiment of the present disclosure;

Throughout the drawings, it should be noted that like reference numbers are used to depict the same or similar elements, features, and structures.

DETAILED DESCRIPTION

Figure 1:
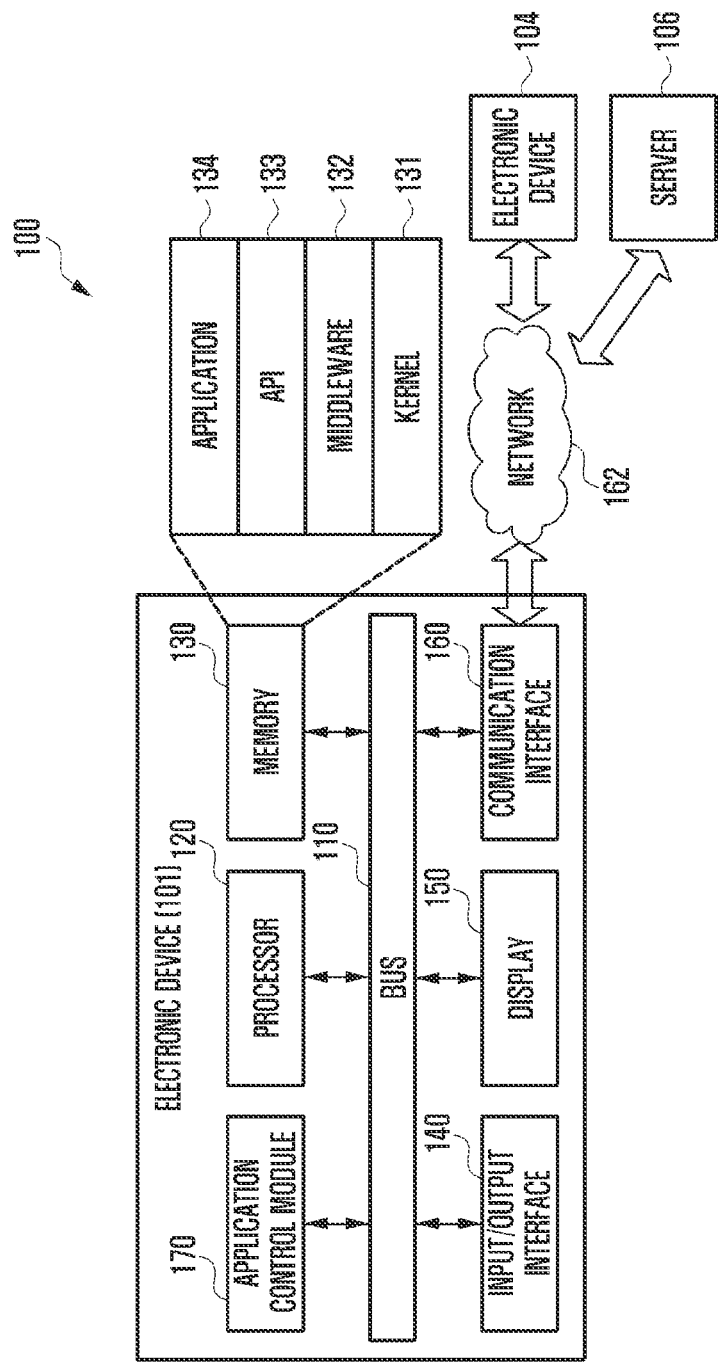
FIG. 1 is a diagram illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include" and/or "may include," which may be used in describing various embodiments of the present disclosure refer to the existence of a corresponding disclosed function, operation or component which can be used in various embodiments of the present disclosure and do not limit one or more additional functions, operations, or components. In various embodiments of the present disclosure, the terms "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

In various embodiments of the present disclosure, the expressions "or" and/or "at least one of A or/and B" include any or all of combinations of words listed together. For example, the expression "A or B" and/or "at least A or/and B" may include A, may include B, and/or may include both A and B.

The expressions "1," "2," "first," and/or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" and/or "connected to" another component, the component may be directly coupled or connected to another component or a new component may exist between the component and another component. In contrast, when it is stated that a component is "directly coupled to" and/or "directly connected to" another component, a new component does not exist between the component and another component. The terms used in describing various embodiments of the present disclosure are only examples for describing a specific embodiment but do not limit the various embodiments of the present disclosure.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a projection function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and an electronic bracelet, an electronic necklace, an electronic appcessory, an electronic tattoo, and a smart watch. According to various embodiments of the present disclosure, the electronic device may be a smart home appliance having a projection function. The smart home appliance may include at least one of a TeleVision (TV), a Digital Versatile Disc (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to various embodiments of the present disclosure, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionic equipment, a security device, a head unit for a vehicle, an industrial or home robot, an Automatic Teller Machine (ATM) of financial institutions, and a Point of Sale (POS) device used by stores.

According to various embodiments of the present disclosure, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a projection function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments of the present disclosure may refer to a person who uses an electronic device or a device (for example, an artificial intelligence electronic device) which uses an electronic device.

FIGS. 1 through 10, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 illustrates a network environment including an electronic device according to an embodiment of the present disclosure.

Referring to FIG. 1, a network environment 100 including an electronic device 101 is illustrated, where the electronic device 101 includes a bus 110, a processor 120, a memory 130, an input/output interface 140, a display 150, a communication interface 160, and an application control module 170 (e.g., a projecting management module).

The bus 110 may be a circuit connecting the above described components and transmitting communication (for example, a control message) between the above described components.

The processor 120 receives commands from other components (for example, the memory 130, the input/output interface 140, the display 150, the communication interface 160, and/or the application control module 170) through the bus 110, analyzes the received commands, and executes calculation or data processing according to the analyzed commands.

The memory 130 stores commands or data received from the processor 120 or other components (for example, the input/output interface 140, the display 150, the communication interface 160, and/or the application control module 170) and/or generated by the processor 120 or other components. The memory 130 may include programming modules, for example, a kernel 131, middleware 132, an Application Programming Interface (API) 133, and an application 134. Each of the aforementioned programming modules may be implemented by software, firmware, hardware, or a combination of two or more thereof.

The kernel 131 controls or manages system resources (for example, the bus 110, the processor 120, and/or the memory 130) used for executing an operation or function implemented by the remaining other programming modules, for example, the middleware 132, the API 133, or the application 134. Further, the kernel 131 provides an interface for accessing individual components of the electronic device 101 from the middleware 132, the API 133, and/or the application 134 to control or manage the components.

The middleware 132 performs a relay function of allowing the API 133 and/or the application 134 to communicate with the kernel 131 to exchange data. Further, in response to operation requests received from the application 134, the middleware 132 performs a control for the operation requests (for example, scheduling or load balancing) by using a method of assigning a priority, by which system resources (for example, the bus 110, the processor 120, the memory 130 and the like) of the electronic device 101 can be used, to the application 134.

The API 133 is an interface by which the application 134 can control a function provided by the kernel 131 or the middleware 132 and includes, for example, at least one interface or function (for example, a command) for a file control, a window control, image processing, or a character control.

According to various embodiments of the present disclosure, the application 134 may include a Short Message Service (SMS)/Multimedia Messaging Service (MMS) application, an email application, a calendar application, an alarm application, a health care application (for example, an application measuring quantity of exercise and/or blood sugar) and/or an environment information application (for example, an application providing information on barometric pressure, humidity and/or temperature). Additionally or alternatively, the application 134 may be an application related to an information exchange between the electronic device 101 and an external electronic device (for example, electronic device 104). The application related to the information exchange may include, for example, a notification relay application for transferring particular information to the external electronic device or a device management application for managing the external electronic device.

For example, the notification relay application may include a function of transmitting notification information generated by another application (for example, an SMS/MMS application, an email application, a health care application or an environment information application) of the electronic device 101 to the external electronic device (for example, electronic device 104). Additionally or alternatively, the notification relay application may receive notification information from, for example, the external electronic device 104 and provide the received notification information to the user. The device management application may manage (for example, install, remove, or update) at least a part of functions (for example, turning on/off the external electronic device (or some components of the external electronic device) or controlling a brightness of the display) of the external electronic device 104 communicating with the electronic device 101, an application executed in the external electronic device 104, or a service (for example, call service or message service) provided by the external electronic device 104.

According to various embodiments of the present disclosure, the application 134 may include an application designated according to an attribute (for example, type of electronic device) of the external electronic device 104. For example, when the external electronic device 104 is an MP3 player, the application 134 may include an application related to music reproduction. Similarly, when the external electronic device 104 is a mobile medical device, the application 134 may include an application related to health care. According to an embodiment of the present disclosure, the application 134 may include at least one of an application designated to the electronic device 101 and an application received from other external electronic devices (for example, server 106 and/or electronic device 104).

The input/output interface 140 transmits a command or data input from the user through an input/output device (for example, a sensor, a keyboard, or a touch screen) to the processor 120, the memory 130, the communication interface 160, or the application control module 170 through, for example, the bus 110. For example, the input/output interface 140 may provide data on a user's touch input through a touch screen to the processor 120. Further, the input/output interface 140 may output a command or data received through, for example, the bus 110, from the processor 120, the memory 130, the communication interface 160, or the application control module 170 through the input/output device (for example, a speaker or a display). For example, the input/output interface 140 may output voice data processed through the processor 120 to the user through the speaker.

The display 150 displays various pieces of information (for example, multimedia data, text data, or the like) for the user. The communication interface 160 connects communication between the electronic device 101 and the external device (for example, electronic device 104 or server 106). For example, the communication interface 160 may access a network 162 through wireless or wired communication to communicate with the external device. The wireless communication includes at least one of, for example, WiFi, BlueTooth (BT), Near Field Communication (NFC), a GPS, and cellular communication (for example, Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro) or Global System for Mobile communications (GSM)). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment of the present disclosure, the network 162 may be a telecommunication network. The telecommunication network includes at least one of a computer network, Internet, Internet of things, and a telephone network. According to an embodiment of the present disclosure, a protocol (for example, transport layer protocol, data link layer protocol, or physical layer protocol) for communication between the electronic device 101 and the external device may be supported by at least one of the application 134, the API 133, the middleware 132, the kernel 131, and the communication interface 160.

The application control module 170 may detect sensor data using sensors, and may determine a hand-held position of the electronic device 101, based on the sensor data. In addition, the application control module 170 may configure a control menu related to the content that is displayed on the touch screen (e.g., the display 150), based on the hand-held position, and may display the configured control menu at the hand-held position. The control menu may include a control menu for the electronic device 101, which is displayed in one area, and a control menu for the content, which is displayed in the other area.

When the electronic device 101 is held by a left hand, the application control module 170 may configure a left-hand mode control menu, and when the electronic device 101 is held by a right hand, may configure a right-hand mode control menu. The application control module 170 may receive a touch input on the touch screen, may determine whether the position of the touch belongs to a left area or a right area with respect to a central line of the touch screen, if the hand-held position or the touch position belongs to the left area, may configure a left-hand mode control menu to be displayed at the touch position, and if the hand-held position or the touch position belongs to the right area, may configure a right-hand mode control menu to be displayed at the touch position.

According to various embodiments of the present disclosure, if the hand-held position belongs to a different area from the touch position area, the application control module 170 may give priority to the hand-held position and the touch position, and may configure the control menu according to the priority.

According to various embodiments of the present disclosure, the application control module 170 may control to configure a display area, where the configured control menu is to be displayed, to be centered in the touch position, and when a portion of the display area is included in the bezel area that surrounds a viewing area of the touch screen, to display a portion of the configured control menu, which is included in the viewing area, on the touch screen. When a touch input on the configured control menu moves to the bezel area, the application control module 170 may control to remove the configured control menu from the viewing area. The application control module 170 may control to display a control menu related to the content after removing the configured control menu. The application control module 170 may control to change the size of the configured control menu, based on the size of the touch, and to display the size-changed control menu on the touch screen. If no sensor data is detected, the application control module 170 may control to display a control menu related to the content.

Various embodiments of the present disclosure provide an apparatus and a method for providing a user interface that can display a control menu related to the content displayed on the touch screen according to a hand-held position of the electronic device 101 or a touch position on the touch screen provided in the electronic device 101.

Figure 2:
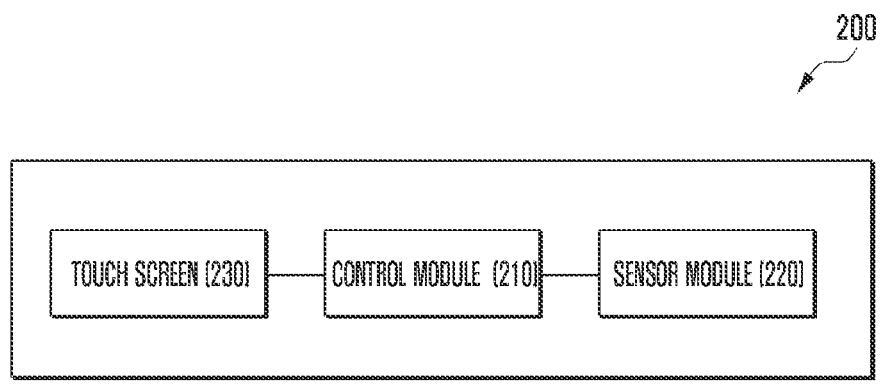
FIG. 2 is a block diagram of an electronic device according to an embodiment of the present disclosure.

FIG. 2 is a block diagram of an electronic device according to an embodiment of the present disclosure.

Referring to FIG. 2, an electronic device 200 is illustrated, where the electronic device 200 may include a control module 210, a sensor module 220, and a touch screen 230. The electronic device 200 may be, for example, a tablet PC that is too big to be held by one hand.

The sensor module 220 may detect sensor data. The sensor module 220 may be at least one of a gyro-sensor, an acceleration sensor, a humidity sensor, a temperature sensor, a proximity sensor, an infrared sensor, an illuminance sensor, an image sensor, an earth magnetic field sensor, and the like. The sensor data relates to information on at least one of movement, angle, speed, humidity, temperature, proximity, and/or brightness.

The control module 210 may determine the hand-held position, i.e., whether the user holds the electronic apparatus with a left hand or with a right hand. The control module 210 may configure a control menu related to the content that is being displayed on the touch screen 230, based on the hand-held position. The content may include at least one piece of information stored in the electronic device 200, which includes multimedia data including text data, audio data, and video data, applications, such as games, phone calls, and the Internet, a contact list, or notes.

According to various embodiments of the present disclosure, when the electronic device 200 is determined to be held by a left hand (left-hand-held), the control module 210 may configure a left-hand mode control menu, whereas when the electronic apparatus is determined to be held by a right hand (right-hand-held), the control module 210 may configure a right-hand mode control menu. The control module 210 may display the left-hand mode control menu or the right-hand mode control menu, based on the hand-held position. For example, the control module 210 may display the left-hand mode control menu or the right-hand mode control menu in the area adjacent to the hand-held position.

According to various embodiments of the present disclosure, the control module 210 may receive a touch input on the touch screen 230, may determine whether the position of the touch belongs to a left area or a right area with respect to a central line of the touch screen, if the hand-held position or the touch position belongs to the left area, may configure a left-hand mode control menu, and if the hand-held position or the touch position belongs to the right area, may configure a right-hand mode control menu. The control module 210 may control to display the configured control menu at the touch position. That is, the touch screen 230 may display the left-hand mode control menu or the right-hand mode control menu at the touch position.

According to various embodiments of the present disclosure, if the hand-held position of the electronic device 200 belongs to a different area from the touch position area, the control module 210 may give priority to the hand-held position and the touch position, and may configure the control menu according to the priority.

According to various embodiments of the present disclosure, the control module 210 may control to configure a display area where the configured control menu is to be displayed, to be centered in the touch position, and when a portion of the display area is included in the bezel area that surrounds a viewing area of the touch screen, to display a portion of the configured control menu, which is included in the viewing area, on the touch screen 230. The viewing area may be the area that displays data such as text, images, or the like. The bezel area is a non-viewing area surrounding the viewing area. In general, the bezel area is printed in one of colors, such as black, white, or pink, or in a combination thereof in order to cover circuits, terminals, or patterns. That is, in displaying the control menu, the control module 210 may display one part of the control menu in the viewing area with the other part thereof covered by the bezel area.

According to various embodiments of the present disclosure, when a touch input on the configured control menu moves to the bezel area, the control module 210 may control to remove the configured control menu from the viewing area. At this time, the touch movement may be a flicking motion by which the touch input detected on the control menu moves to the bezel area at a predetermined speed. The control module 210 may not display the configured control menu in the viewing area. In this case, the control module 210 may control to display a control menu related to the content after removing the control menu.

At this time, the control menu may be a typical menu provided together with the content. Alternatively, if no sensor data is detected, the control module 210 may control to display a control menu related to the content. That is, if no sensor data is detected, the control module 210 may determine that the user does not hold the electronic apparatus for use. In this case, the control module 210 may control to display a general control menu. The control module 210 may control to change the size of the configured control menu, based on the size of the touch input to thereby display the size-changed control menu on the touch screen 230.

The electronic device 200, according to various embodiments of the present disclosure, may include: the sensor module 220 that detects sensor data; the touch screen 230 that displays a control menu related to the content that is displayed; and the control module 210 that determines a hand-held position of the electronic device 200, based on the sensor data, configures the control menu, based on the hand-held position, and controls to display the configured control menu, based on the hand-held position.

The sensor module 220 may be at least one of a gyro-sensor, an acceleration sensor, a humidity sensor, a temperature sensor, a proximity sensor, an infrared sensor, an illuminance sensor, an image sensor, an earth magnetic field sensor, or the like.

If the hand-held position corresponds to a left hand, the control module 210 may configure a left-hand mode control menu, and if the hand-held position corresponds to a right hand, may configure a right-hand mode control menu.

The control module 210 may receive a touch input on the touch screen, may determine whether the touch position belongs to a left area or a right area with respect to a central line of the touch screen, if the hand-held position or the touch position belongs to the left area, may configure a left-hand mode control menu to be displayed on the touch position, and if the hand-held position or the touch position belongs to the right area, may configure a right-hand mode control menu to be displayed at the touch position.

The control module 210 may control to configure a display area, where the configured control menu is to be displayed, to be centered in the touch position, and when a portion of the display area is included in the bezel area that surrounds a viewing area of the touch screen, to display a portion of the configured control menu, which is included in the viewing area, on the touch screen 230.

The control module 210 may control to change a size of the configured control menu, based on a size of the touch, and to display the size-changed control menu on the touch screen.

If the hand-held position belongs to a different area from the touch position area, the control module may give priority to the hand-held position and the touch position, and may configure the control menu according to the priority.

When a touch input on the configured control menu moves to a bezel area that surrounds a viewing area of the touch screen, the control module 210 may control to remove the configured control menu from the viewing area.

The control module 210 may control to display a control menu related to the content after removing the configured control menu.

The control module 210, if no sensor data is detected, may control to display a control menu related to the content.

Figure 3:
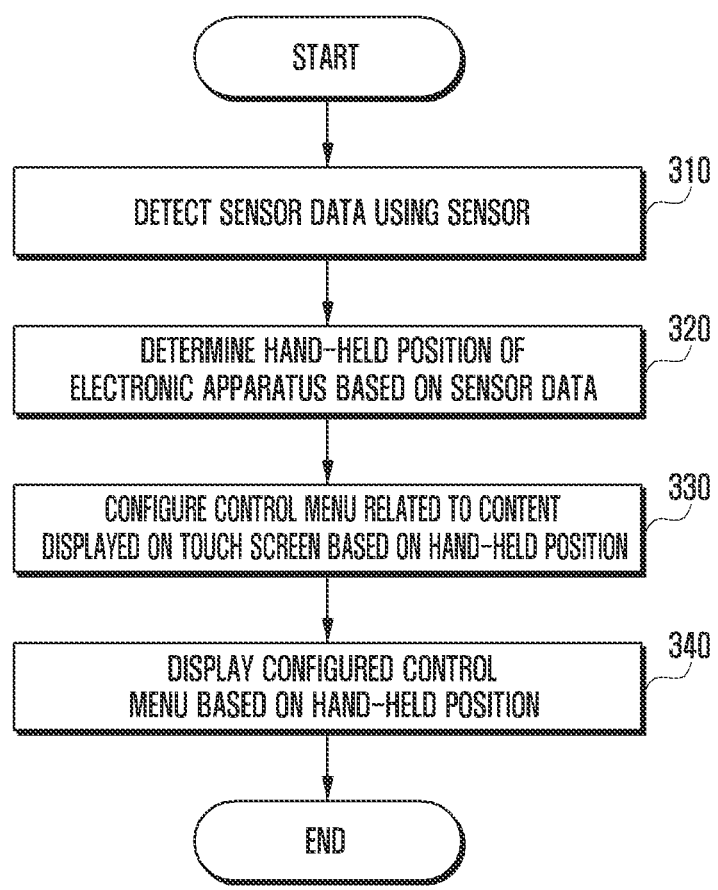
FIG. 3 is a flowchart illustrating a method for providing a user interface according to an embodiment of the present disclosure.

FIG. 3 is a flowchart illustrating a method for providing a user interface according to an embodiment of the present disclosure. The method for providing a user interface may be executed by an electronic device adopting a touch screen.

Referring to FIG. 3, a flowchart is illustrated, such that in operation 310, an electronic apparatus (device) may detect sensor data using a sensor. The electronic apparatus may detect the sensor data using at least one of a gyro-sensor, an acceleration sensor, a humidity sensor, a temperature sensor, a proximity sensor, an infrared sensor, an illumination sensor, an image sensor, an earth magnetic field sensor, and the like. For example, if a user holds the electronic apparatus for use with his/her hands, the sensor data may be detected. On the contrary, if the user does not hold the electronic apparatus for use, the sensor data may not be detected. In some cases, the user may put the electronic apparatus on the desk or in external devices without holding the same. For example, if the user holds electronic apparatus with hands, the gyro-sensor may detect a change in angles, or the temperature sensor or the humidity sensor may detect a change in temperature or humidity, respectively.

In operation 320, the electronic apparatus may determine a hand-held position of the electronic apparatus, based on the sensor data. When a change in temperature or humidity is detected in the left area of the electronic apparatus, the electronic apparatus may determine that the user holds the electronic apparatus with their left hand (left-hand-held).

Alternatively, when a change in temperature or humidity is detected in the right area of the electronic apparatus, the electronic apparatus may determine that the user holds the electronic apparatus with their right hand (right-hand-held).

In operation 330, the electronic apparatus may configure a control menu related to the content that is displayed on the touch screen, based on the hand-held position. According to various embodiments of the present disclosure, when the electronic apparatus is determined to be held by a left hand, the electronic apparatus may configure a left-hand mode control menu, whereas when the electronic apparatus is determined to be held by a right hand, the electronic apparatus may configure a right-hand mode control menu.

The control menu is a user interface that is able to control content. For example, if the content is "music," the electronic apparatus may extract at least one of play, pause, stop, rewind, and fast forward as a control menu for music. The electronic apparatus may configure at least one of play, pause, rewind, and fast forward as the control menu.

In operation 340, the electronic apparatus may display the configured control menu, based on the hand-held position. The electronic apparatus may display the configured control menu at the position adjacent to the hand-held position or in a predetermined area close to the hand-held position.

According to various embodiments of the present disclosure, the electronic apparatus may receive a touch input on the touch screen and may determine whether the touch position belongs to a left area or to a right area with respect to the central line of the touch screen. When the hand-held position or the touch position belongs to the left area, the electronic apparatus may configure a left-hand mode control menu and may display the same at the touch position. In addition, when the hand-held position or the touch position belongs to the right area, the electronic apparatus may configure a right-hand mode control menu and may display the same at the touch position. If the hand-held position belongs to a different area from the touch position area, the electronic apparatus may give priority to the hand-held position and the touch position. For example, the priority of the hand-held position and the touch position may be determined according to a user setup or a predetermined value set as a default in the electronic apparatus.

For example, when the user holds the electronic apparatus with their left hand and the touch input has been received in the left area, the electronic apparatus may display the left-hand mode control menu at the touch position. In addition, when the user holds the electronic apparatus with their left hand and the touch input has been received in the right area, the electronic apparatus may display the right-hand mode control menu at the touch position. At this time, even with the electronic apparatus held by the left hand, since the touch input belongs to the right area, the electronic apparatus may display the right-hand mode control menu. That is, the electronic apparatus may consider the touch position rather than the hand-held position.

Alternatively, when the user holds the electronic apparatus with their right hand and the touch input has been received in the right area, the electronic apparatus may display the right-hand mode control menu at the touch position. In addition, when the user holds the electronic apparatus with a right hand and the touch input has been received in the left area, the electronic apparatus may display the left-hand mode control menu at the touch position. At this time, even with the electronic apparatus held by the right hand, since the touch input belongs to the left area, the electronic apparatus may display the left-hand mode control menu.

According to various embodiments of the present disclosure, the electronic apparatus may control to configure a display area, where the configured control menu is to be displayed, to be centered in the touch position, and when a portion of the display area is included in the bezel area that surrounds a viewing area of the touch screen, to display a portion of the configured control menu, which is included in the viewing area, on the touch screen. For example, if the whole display area is included in the viewing area, the electronic apparatus may display the control menu at the touch position. However, if the display area is partially included in the viewing area, the electronic apparatus may display only a portion of the configured control menu, which is included in the viewing area, on the touch screen. That is, the electronic apparatus may display not the portion of the control menu, which is included in the bezel area, but the portion of the control menu, which is included in the viewing area.

According to various embodiments of the present disclosure, the electronic apparatus may control to remove the configured control menu from the viewing area when the touch input on the configured control menu moves to the bezel area that surrounds the viewing area of the touch screen. Here, the touch movement may be a flicking motion by which the touch input detected on the control menu moves to the bezel area at a predetermined speed. In this case, the electronic apparatus may not display the configured control menu in the viewing area. The electronic apparatus may control to display the control menu which is related to the content after removing the control menu.

At this time, the control menu may be a typical menu provided together with the content. Alternatively, the electronic apparatus may control to display the control menu related to the content when no sensor data is detected. That is, when the sensor data is not detected, the electronic apparatus may determine that the user is not holding the electronic apparatus for use. In this case, the electronic apparatus may control to display a normal control menu.

The electronic apparatus may change a size of the configured control menu according to a size of the touch input and may display the size-changed control menu on the touch screen. For example, the sizes of the contact surfaces of fingers with the touch screen may be different due to various sizes of fingers of different users. Therefore, the electronic apparatus may change the size of the configured control menu according to the size of the touch on the touch screen. For example, if the configured control menu has a diameter of 3 cm, the electronic apparatus may change the size of the configured control menu into various sizes such as 2 cm, 2.5 cm, 3.5 cm, or 5 cm, according to the size of the touch.

A method for providing a user interface, according to various embodiments of the present disclosure, may include: detecting sensor data using a sensor; determining a hand-held position of the electronic apparatus, based on the sensor data; configuring a control menu related to the content displayed on the touch screen, based on the hand-held position; and displaying the configured control menu, based on the hand-held position.

The operation of detecting the sensor data may include detecting the sensor data using at least one of a gyro-sensor, an acceleration sensor, a humidity sensor, a temperature sensor, a proximity sensor, an infrared sensor, an illuminance sensor, an image sensor, an earth magnetic field sensor, and the like.

The operation of configuring the control menu may include, if the hand-held position corresponds to a left hand, configuring a left-hand mode control menu, and if the hand-held position corresponds to a right hand, configuring a right-hand mode control menu.

The method for providing a user interface may further include: receiving a touch input on the touch screen; determining whether the touch position belongs to a left area or a right area with respect to a central line of the touch screen; if the hand-held position or the touch position belongs to the left area, configuring a left-hand mode control menu, or if the hand-held position or the touch position belongs to the right area, configuring a right-hand mode control menu; and displaying the left-hand mode control menu or the right-hand mode control menu at the touch position.

The operation of displaying may include: configuring a display area, where the configured control menu is to be displayed, to be centered in the touch position; and when a portion of the display area is included in the bezel area that surrounds a viewing area of the touch screen, displaying a portion of the configured control menu, which is included in the viewing area, on the touch screen.

The operation of displaying may include: changing the size of the configured control menu, based on the size of the touch; and displaying the size-changed control menu on the touch screen.

The operation of configuring may include: if the hand-held position belongs to a different area from the touch position area, giving priority to the hand-held position and the touch position; and configuring the control menu according to the priority.

The method may further include, when a touch input on the configured control menu moves to a bezel area that surrounds a viewing area of the touch screen, removing the configured control menu from the viewing area.

The method may further include displaying a control menu related to the content displayed on the touch screen after removing the configured control menu.

The method may further include, if no sensor data is detected, displaying a control menu related to the content displayed on the touch screen.

When the user holds the electronic apparatus with hands for use, the movement of the electronic apparatus may be detected by the gyro-sensor or the earth magnetic field sensor, and/or a change of temperature or humidity may be detected by the temperature sensor or the humidity sensor, so the sensor data may be obtained. The electronic apparatus may determine whether the user holds the electronic apparatus with a left hand or a right hand, based on the sensor data. In addition, the electronic apparatus may configure a control menu related to the content displayed on the touch screen, based on the hand-held position, and may display the configured control menu at the area close to the hand-held position.

In addition, the electronic apparatus may configure a control menu related to the content that is displayed on the touch screen, based on the position of the touch detected on the screen, and may display the configured control menu at touch position.

Moreover, after the determination of the hand-held position, the electronic apparatus may configure a control menu related to the content that is displayed on the touch screen, and may display the configured control menu in the area close to the hand-held position. As stated above, in a state in which the control menu is displayed according to the hand-held position, if any touch for changing the control menu is detected, the electronic apparatus may configure a control menu related to the content that is displayed on the touch screen, based on the touch position, and may display the configured control menu at the touch position.

When an event touch for moving the control menu is received, the electronic apparatus may re-configure the control menu according to the touch position, and may display the re-configured control menu at the touch position. The control menu of the electronic apparatus may be displayed in one area, and the control menu of the content may be displayed in another area.

FIG. 4 illustrates an example of detecting sensor data according to an embodiment of the present disclosure.

Referring to FIG. 4, diagrams 410, 420, 430 and 440 are illustrated, in which an example of displaying a control menu according to a hand-held position is provided. For example, as shown in diagram 410, when an electronic apparatus is put on a table or is mounted on an external device, there may be no changes in movement detected by the gyro-sensor or the earth magnetic field sensor, or in temperature or humidity detected by the temperature sensor or the humidity sensor, so no data may be detected. When the sensor data is not detected, the electronic apparatus may determine that the user does not hold the electronic apparatus for use. At this time, the electronic apparatus may display a control menu 410a related to the content displayed on the touch screen. The control menu 410a may be a typical menu provided together with the content.

Meanwhile, when the user holds the electronic apparatus with hands for use as shown in diagrams 420, 430 and 440, the movement of the electronic apparatus may be detected by the gyro-sensor or the earth magnetic field sensor, or a change in temperature or humidity may be detected by the temperature sensor or the humidity sensor, so sensor data may be obtained. The electronic apparatus may determine the hand-held position, i.e., whether the user holds the electronic apparatus with their left or right hand. For example, in the case of diagram 420, since a change in temperature or humidity is detected on both sides, i.e., the left side and the right side, of the electronic apparatus, the electronic apparatus may determine that the user is holding the electronic apparatus with both hands. In this case, the electronic apparatus may provide a right-hand control menu "C/M" that is usually provided.

Alternatively, the electronic apparatus may configure a control menu related to the content displayed on the touch screen, based on the hand-held position or a touch position detected on the touch screen, and may display the configured control menu at the touch position.

However, when a change in temperature or humidity is detected on only one side, the electronic apparatus may configure a different control menu according to the hand-held position to thereby display the same. Diagram 430 of FIG. 4 shows an example of holding the electronic apparatus with a right hand. Here, the electronic apparatus may configure a right-hand mode control menu, and may display the configured control menu, based on the hand-held position. Alternatively, the electronic apparatus may configure the control menu, based on at least one of the hand-held position or the touch position, and then may display the configured control menu at the touch position.

In addition, diagram 440 shows an example of holding the electronic apparatus with a left hand. Here, the electronic apparatus may configure a left-hand control menu, and may display the configured control menu, based on the hand-held position. Alternatively, the electronic apparatus may configure the control menu, based on at least one of the hand-held position or the touch position, and then may display the configured control menu at the touch position.

FIG. 5A illustrates an example of configuring a right-hand mode control menu according to an embodiment of the present disclosure.

Referring to FIG. 5A, diagrams 510, 520, 530 and 540 are illustrated, such that in a case of holding an electronic apparatus with a right hand, the electronic apparatus may configure a right-hand mode control menu.

Specifically, the electronic apparatus may configure items, such as a home button, a back button, or a power-on/off button, which are related to hardware, as the right-hand mode control menu, as shown in diagram 510. Further, the electronic apparatus may configure the right-hand mode control menu (diagram 510), while no content is in progress or a background image is displayed. The control menu of diagram 510 may be included in other right-hand mode control menus shown in diagrams 520, 530 and 540 at the left side thereof.

For example, diagram 520 shows that the electronic apparatus configures a right-hand mode control menu including at least one of functions, such as play, pause, stop, rewind, fast forward, or the like, when the running content is "music."

In addition, diagram 530 shows that the electronic apparatus configures a right-hand mode control menu including at least one of functions, such as photograph, edit, flash-on/off, convert image, or the like, when the running content is "camera."

Furthermore, diagram 540 shows that the electronic apparatus configures a right-hand mode control menu including at least one of functions, such as search, back, forward, scroll, or the like, when the running content is "Internet."

FIG. 5B illustrates an example of configuring a left-hand mode control menu according to an embodiment of the present disclosure.

Referring to FIG. 5B, diagrams 550, 560, 570 and 580 are illustrated, such that in a case of holding an electronic apparatus with a left hand, the electronic apparatus may configure a left-hand mode control menu. The electronic apparatus may configure items, such as a home button, a back button, or a power-on/off button, which are related to hardware, as the left-hand mode control menu, as shown in diagram 550. The control menu of diagram 550 may be included in other left-hand mode control menus as shown in diagrams 560, 570 and 580 at the left side thereof.

For example, diagram 560 shows that the electronic apparatus configures a left-hand mode control menu including at least one of functions, such as play, pause, stop, rewind, fast forward, or the like, when the running content is "music."

In addition, diagram 570 shows that the electronic apparatus configures a left-hand mode control menu including at least one of functions, such as photograph, edit, flash-on/off, convert image, or the like, when the running content is "camera."

Furthermore, diagram 580 shows that the electronic apparatus configures a left-hand mode control menu including at least one of functions, such as search, back, forward, scroll, or the like, when the running content is "Internet."

The electronic apparatus may configure the control menu, based on at least one of the hand-held position or the touch position on the touch screen. For example, the electronic apparatus may configure the control menu by considering the touch position rather than the hand-held position. Alternatively, the electronic apparatus may configure the control menu by considering the hand-held position rather than the touch position.

FIG. 6A illustrates an example of displaying a control menu according to a hand-held position of an electronic apparatus and a touch position thereof according to an embodiment of the present disclosure.

Referring to FIG. 6A, diagrams 610 and 620 are illustrated, where an electronic apparatus may determine whether a hand-held position or a touch position belongs to a left area or to a right area with respect to a central line "C" of the touch screen. When it is determined that the hand-held position corresponds to a "right hand" and the touch position belongs to the "left area," the electronic apparatus may display the left-hand mode control menu at the touch position by considering the touch position rather than the hand-held position, as shown in diagram 610.

Alternatively, when it is determined that the hand-held position corresponds to a "left hand" and the touch position belongs to the "right area," the electronic apparatus may display the right-hand mode control menu at the touch position by considering the touch position rather than the hand-held position, as shown in diagram 620. At this time, when the running content is "music," the electronic apparatus may display the right-hand mode control menu (diagram 610) or the left-hand mode control menu (diagram 620), which are related to music.

Figure 6B:
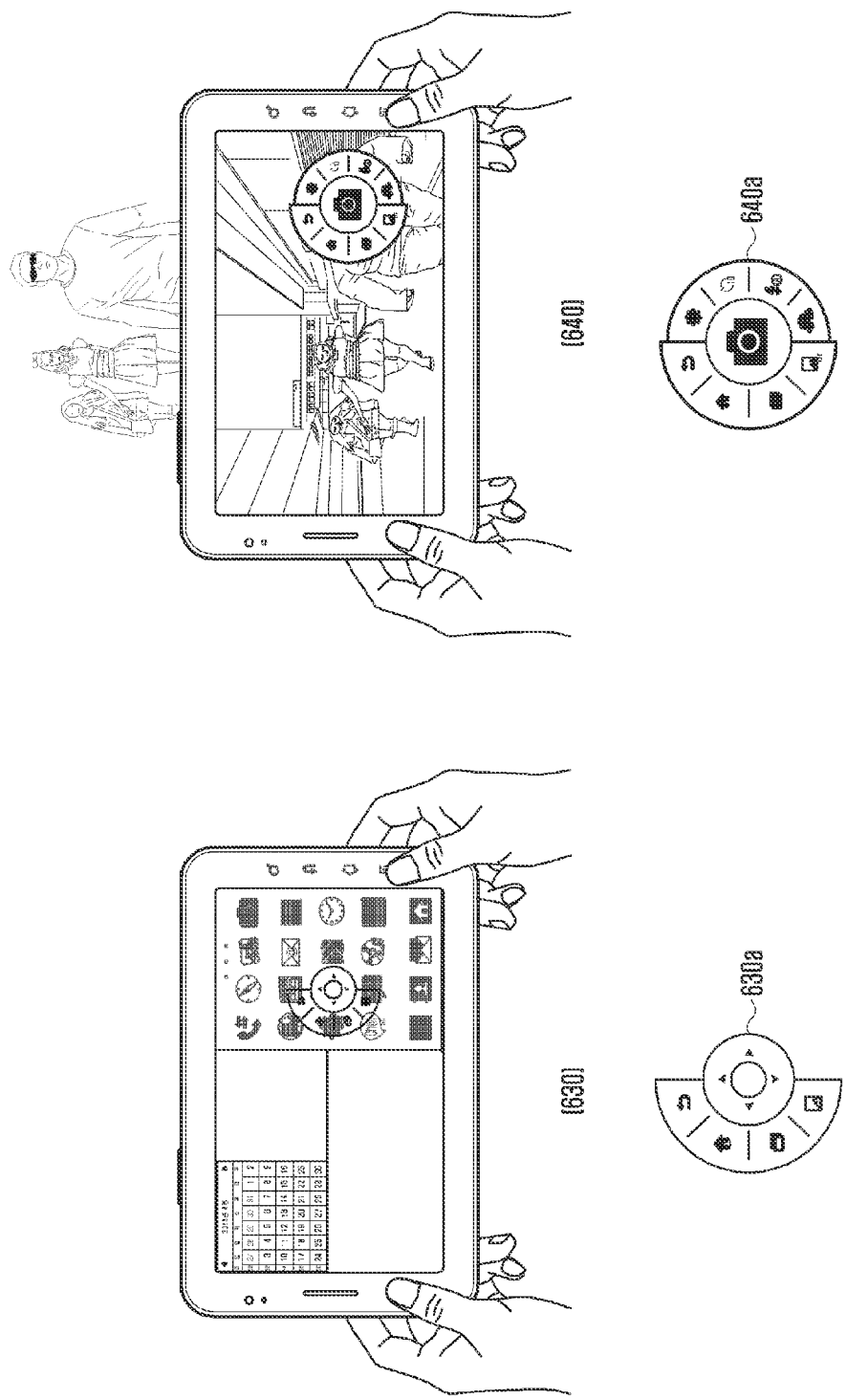
FIG. 6B illustrates an example of displaying a control menu related to content displayed on a touch screen according to an embodiment of the present disclosure.

FIG. 6B illustrates an example of displaying a control menu related to displayed content according to an embodiment of the present disclosure.

Referring to FIG. 6B, diagrams 630 and 640 are illustrated, where an electronic apparatus may display a control menu related to the content displayed on the touch screen. As shown in diagram 630, when the electronic apparatus is held with both hands, and no content is being displayed or in progress, or a home image is being displayed, the electronic apparatus may configure a right-hand mode control menu as denoted by reference numeral 630a, which includes items related to hardware, such as a home button, a back button, a power-on/off button, or the like. The electronic apparatus may display the configured right-hand mode control menu 630a at the position set as a default.

As shown in diagram 640, when the electronic apparatus is held with both hands, and the content of "camera" is displayed on the touch screen, the electronic apparatus may configure a right-hand mode control menu as denoted by reference numeral 640a, which includes at least one of photograph, edit, flash-on/off, convert image, or the like. The electronic apparatus may display the configured right-hand mode control menu 640a at the position set as a default.

FIG. 7 illustrates an example of changing a position of a control menu according to an embodiment of the present disclosure.

Referring to FIG. 7, diagrams 710, 720, 730 and 740 are illustrated, in which diagram 710 illustrates an electronic apparatus that displays an Internet application in a viewing area of a touch screen and a first touch is input in the viewing area. The viewing area may be the area that displays data such as text, images, videos, sound data, or the like. The electronic apparatus may determine whether a position of the first touch belongs to a left area or to a right area with respect to the central line "C," as illustrated in FIG. 6A.

As a result of the determination, if the first touch position belongs to the right area, the electronic apparatus may configure the right-hand mode control menu, and may display the configured right-hand mode control menu at the first touch position as shown in diagram 720.

The electronic apparatus may receive the second touch input as shown in diagram 730. The electronic apparatus may determine whether the position of second touch belongs to the left area or to the right area with respect to the central line "C".

As a result of the determination, if the second touch position belongs to the right area, more specifically, between the viewing area and the bezel area, the electronic apparatus may display a portion of the right-hand mode control menu at the second touch position as shown in diagram 740.

At this time, the electronic apparatus may configure a display area "D/A," where the configured control menu is to be displayed, to be centered in the touch position. For example, the display area may have a radius of 1.5 cm around the center of the configured control menu. The display area may vary with the size of the control menu. If a portion of the display area is included in the bezel area surrounding the viewing area, the electronic apparatus may display a portion of the configured control menu, which is included in the viewing area, on the touch screen.

For example, if the entire display area is included in the viewing area, the electronic apparatus may display the control menu at the position. However, if the display area is partially included in the viewing area, the electronic apparatus may display only a portion of the configured control menu, which is included in the viewing area. That is, a portion of the control menu, which is included in the bezel area, may not be displayed, whereas a portion of the control menu, which is included in the viewing area, may be displayed.

Figure 8:
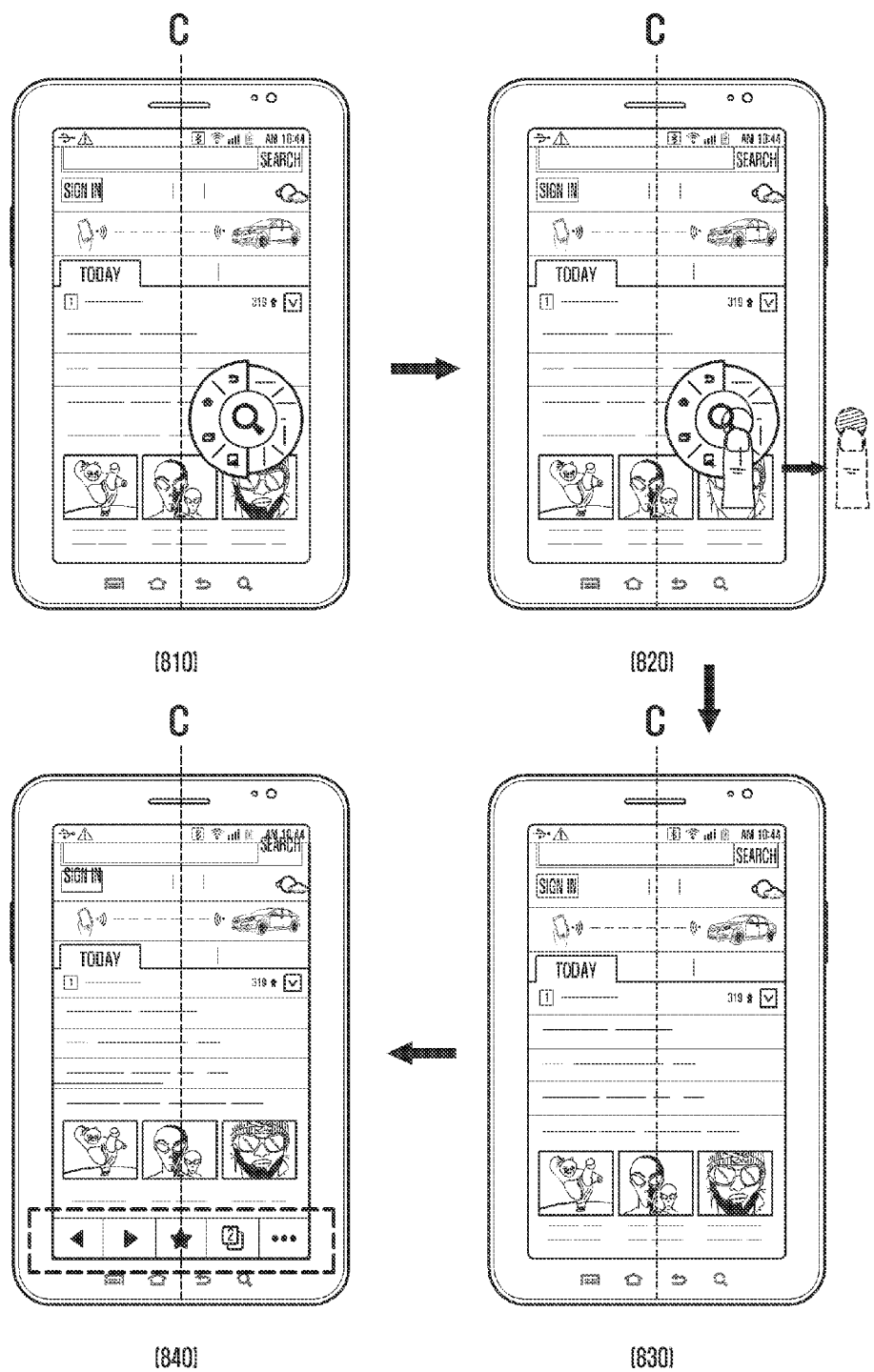
FIG. 8 illustrates an example of removing a control menu according to an embodiment of the present disclosure.

FIG. 8 illustrates an example of removing a control menu according to an embodiment of the present disclosure.

Referring to FIG. 8, diagrams 810, 820, 830 and 840 are illustrated, where diagram 810 shows an example of a control menu displayed in the viewing area.

Further, diagram 820 shows that an electronic apparatus detects a touch input on the displayed control menu and determines whether the detected touch moves to the bezel area.

If the detected touch moves to the bezel area, the electronic apparatus may remove the control menu from the viewing area as shown in diagram 830. That is, the electronic apparatus does not display the control menu in the viewing area.

The electronic apparatus may display a function menu related to the content displayed on the touch screen after removing the control menu, as shown in diagram 840. At this time, the control menu of diagram 840 may be a typical menu provided together with the content.

Figure 9:
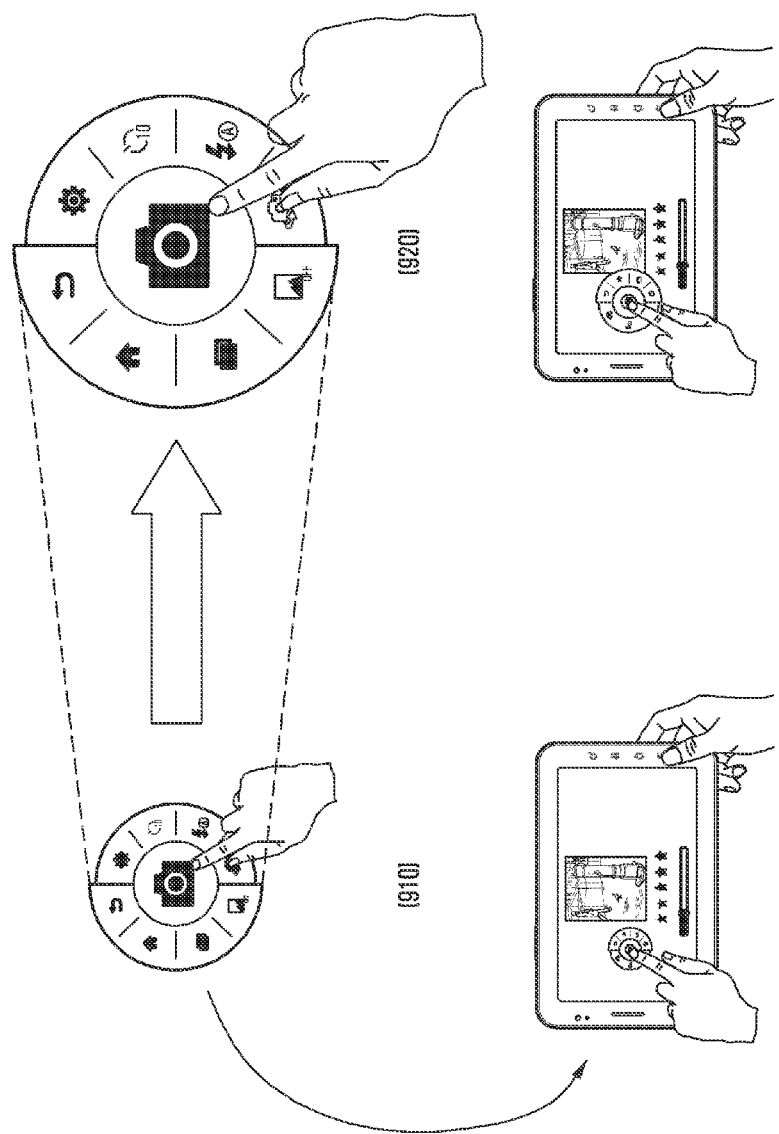
FIG. 9 illustrates an example of changing a size of a control menu according to an embodiment of the present disclosure.

FIG. 9 illustrates an example of changing a size of a control menu according to an embodiment of the present disclosure.

Referring to FIG. 9, diagrams 910 and 920 are illustrated, in which an electronic apparatus may change a size of a control menu, based on a size of a touch input on a touch screen, and may display the size-changed control menu on the touch screen.

For example, sizes of fingers may be different depending on users, so the sizes of contact surfaces of the fingers with the touch screen may be different as well. Therefore, the electronic apparatus may change the size of the configured control menu, based on the size of a contact surface of the touch with the touch screen.

For example, as shown in diagram 910, the electronic apparatus may display the basic control menu having a diameter of 3 cm. However, as shown in diagram 920, the electronic apparatus may increase the size of the configured control menu according to the size of a contact surface of the touch. The electronic apparatus may display the size-changed control menu on the touch screen.

Figure 10:
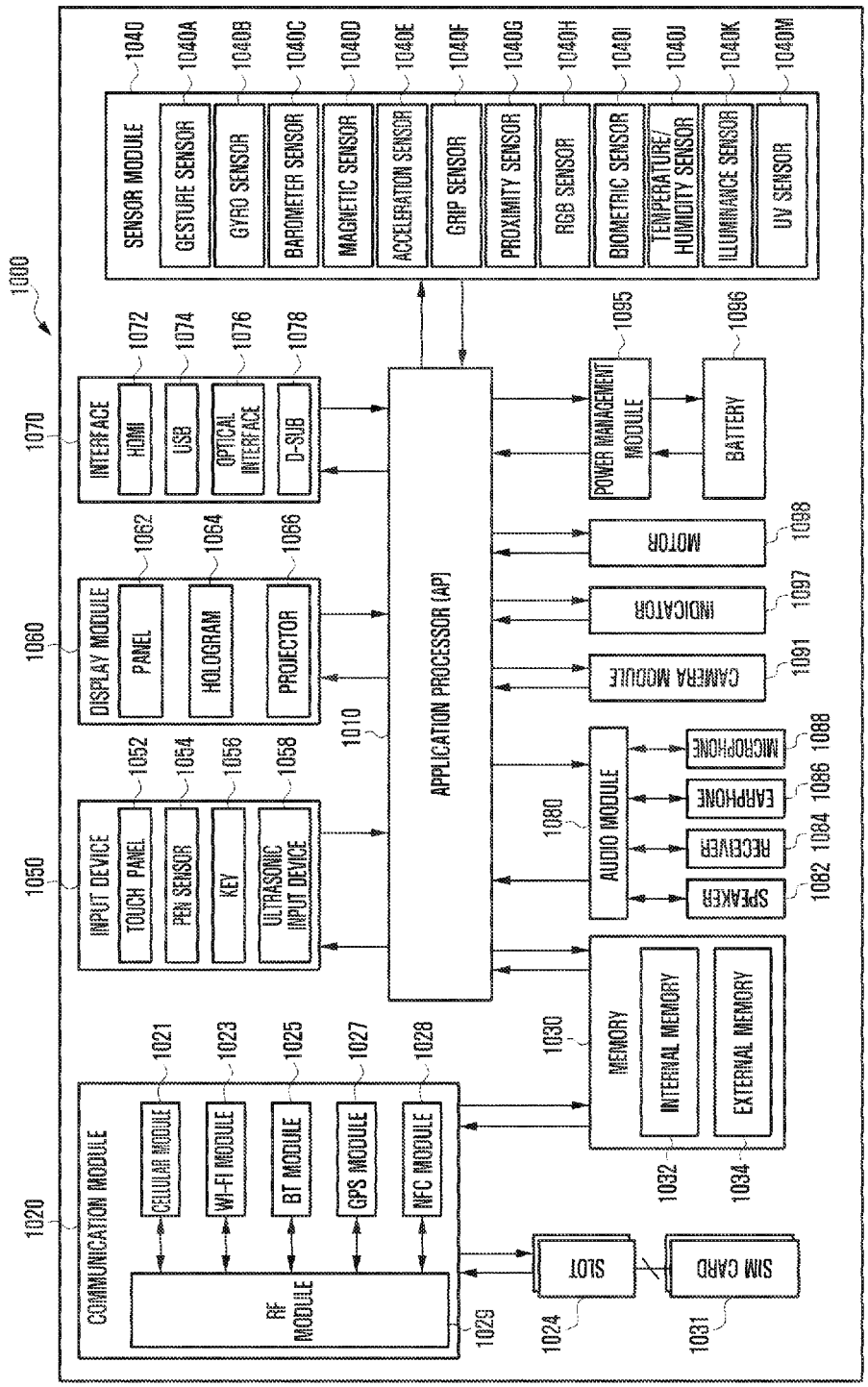
FIG. 10 illustrates a block diagram of an electronic apparatus according to an embodiment of the present disclosure.

FIG. 10 illustrates a block diagram of an electronic device according to an embodiment of the present disclosure. The electronic device may be configured as, for example, a whole or a part of the electronic device 101, as illustrated in FIG. 1.

Referring to FIG. 10, an electronic device 1000 is illustrated, where the electronic device 1000 includes one or more Application Processors (APs) 1010, a communication module 1020, a slot 1024, a Subscriber Identification Module (SIM) card 1031, a memory 1030, a sensor module 1040, an input device 1050, a display module 1060, an interface 1070, an audio module 1080, a camera module 1091, a power managing module 1095, a battery 1096, an indicator 1097, and a motor 1098.

The AP 1010 operates an operating system (OS) or an application program so as to control a plurality of hardware or software component elements connected to the AP 1010 and execute various data processing and calculations including multimedia data. The AP 1010 may be implemented by, for example, a System on Chip (SoC). According to an embodiment of the present disclosure, the AP 1010 may further include a Graphic Processing Unit (GPU). The AP 1010 may further include the application control module 170, as illustrated in FIG. 1.

The communication module 1020 (for example, the communication interface 160, as illustrated in FIG. 1) transmits/receives data in communication between different electronic devices (for example, the electronic device 104 and the server 106, as illustrated in FIG. 1) connected to the electronic device 1000 (for example, electronic device 101, as illustrated in FIG. 1) through a network. According to an embodiment of the present disclosure, the communication module 1020 includes a cellular module 1021, a WiFi module 1023, a BT module 1025, a GPS module 1027, an NFC module 1028, and a Radio Frequency (RF) module 1029.

The cellular module 1021 provides a voice, a call, a video call, an SMS, or an Internet service through a communication network (for example, LTE, LTE-A, CDMA, WCDMA, UMTS, WiBro, GSM or the like). Further, the cellular module 1021 may distinguish and authenticate electronic devices within a communication network by using a SIM (for example, the SIM card 1031). According to an embodiment of the present disclosure, the cellular module 1021 performs at least some of the functions which can be provided by the AP 1010. For example, the cellular module 1021 may perform at least some of the multimedia control functions.

According to an embodiment of the present disclosure, the cellular module 1021 may include a Communication Processor (CP). Further, the cellular module 1021 may be implemented by, for example, an SoC.

Although the components such as the cellular module 1021 (for example, a communication processor), the memory 1030, and the power managing module 1095 are illustrated as components separate from the AP 1010 in FIG. 10, the AP 1010 may include at least some (for example, cellular module 1021) of the aforementioned components in an embodiment of the present disclosure.

According to an embodiment of the present disclosure, the AP 1010 or the cellular module 1021 (for example, the communication processor) may load a command or data received from at least one of a non-volatile memory and other components connected to each of the AP 1010 and the cellular module 1021 to a volatile memory and process the loaded command or data. Further, the AP 1010 or the cellular module 1021 may store data received from at least one of other components or generated by at least one of other components in a non-volatile memory.

Each of the WiFi module 1023, the BT module 1025, the GPS module 1027, and the NFC module 1028 may include, for example, a processor for processing data transmitted/received through the corresponding module. Although the cellular module 1021, the WiFi module 1023, the BT module 1025, the GPS module 1027, and the NFC module 1028 are illustrated as blocks separate from each other in FIG. 10, at least some (for example, two or more) of the cellular module 1021, the WiFi module 1023, the BT module 1025, the GPS module 1027, and the NFC module 1028 may be included in one Integrated Chip (IC) or one IC package according to an embodiment of the present disclosure. For example, at least some (for example, the communication processor corresponding to the cellular module 1021 and the WiFi processor corresponding to the WiFi module 1023) of the processors corresponding to the cellular module 1021, the WiFi module 1023, the BT module 1025, the GPS module 1027, and the NFC module 1028 may be implemented by one SoC.

The RF module 1029 transmits/receives data, for example, an RF signal. Although not illustrated, the RF module 1029 may include, for example, a transceiver, a Power Amp Module (PAM), a frequency filter, a Low Noise Amplifier (LNA) or the like. Further, the RF module 1029 may further include a component for transmitting/receiving electronic waves over a free air space in wireless communication, for example, a conductor, a conducting wire, or the like. Although the cellular module 1021, the WiFi module 1023, the BT module 1025, the GPS module 1027, and the NFC module 1028 share one RF module 1029 in FIG. 10, at least one of the cellular module 1021, the WiFi module 1023, the BT module 1025, the GPS module 1027, and the NFC module 1028 may transmit/receive an RF signal through a separate RF module according to an embodiment of the present disclosure.

The SIM card 1031 is a card including a SIM and may be inserted into the slot 1024 formed in a particular portion of the electronic device. The SIM card 1031 includes unique identification information (for example, Integrated Circuit Card IDentifier (ICCID)) or subscriber information (for example, International Mobile Subscriber Identity (IMSI)).

The memory 1030 (for example, memory 130, as illustrated in FIG. 1) may include an internal memory 1032 and/or an external memory 1034. The internal memory 1032 may include, for example, at least one of a volatile memory (for example, a Random Access Memory (RAM), a dynamic RAM (DRAM), a static RAM (SRAM), a synchronous DRAM (SDRAM), and the like), and a non-volatile Memory (for example, a Read Only Memory (ROM), a one-time programmable ROM (OTPROM), a PROM, an erasable and programmable ROM (EPROM), an electrically erasable and programmable ROM (EEPROM), a mask ROM, a flash ROM, a NAND flash memory, an NOR flash memory, and the like).

According to an embodiment of the present disclosure, the internal memory 1032 may be a Solid State Drive (SSD). The external memory 1034 may further include a flash drive, for example, a Compact Flash (CF), a Secure Digital (SD), a Micro-SD, a Mini-SD, an extreme Digital (xD), or a memory stick. The external memory 1034 may be functionally connected to the electronic device 1000 through various interfaces. According to an embodiment of the present disclosure, the electronic device 1000 may further include a storage device (or storage medium) such as a hard drive.

The sensor module 1040 measures a physical quantity or detects an operation state of the electronic device 1000, and converts the measured or detected information to an electronic signal. The sensor module 1040 may include, for example, at least one of a gesture sensor 1040A, a gyro sensor 1040B, an atmospheric pressure (barometric) sensor 1040C, a magnetic sensor 1040D, an acceleration sensor 1040E, a grip sensor 1040F, a proximity sensor 1040G, a Red, Green and Blue (RGB) sensor 1040H, a biometric sensor 1040I, a temperature/humidity sensor 1040J, an illuminance (light) sensor 1040K, and an Ultra Violet (UV) sensor 1040M.

Additionally or alternatively, the sensor module 1040 may include, for example, a E-nose sensor, an electromyography (EMG) sensor, an electroencephalogram (EEG) sensor, an electrocardiogram (ECG) sensor, an InfraRed (IR) sensor, an iris sensor, a fingerprint sensor (not illustrated), and the like. The sensor module 1040 may further include a control circuit for controlling one or more sensors included in the sensor module 1040.

The input device 1050 includes a touch panel 1052, a (digital) pen sensor 1054, a key 1056, and an ultrasonic input device 1058. For example, the touch panel 1052 may recognize a touch input in at least one type of a capacitive type, a resistive type, an infrared type, and an acoustic wave type. The touch panel 1052 may further include a control circuit. In the capacitive type, the touch panel 1052 can recognize proximity as well as a direct touch. The touch panel 1052 may further include a tactile layer. In this event, the touch panel 1052 provides a tactile reaction to the user.

The (digital) pen sensor 1054 may be implemented, for example, using a method identical or similar to a method of receiving a touch input of the user, or using a separate recognition sheet. The key 1056 may include, for example, a physical button, an optical key, or a key pad. The ultrasonic input device 1058 is a device which can detect an acoustic wave by a microphone (for example, a microphone 1088) of the electronic device 1000 through an input means generating an ultrasonic signal to identify data and can perform wireless recognition. According to an embodiment of the present disclosure, the electronic device 1000 receives a user input from an external device (for example, computer or server) connected to the electronic device 1000 by using the communication module 1020.

The display module 1060 (for example, the display 150, as illustrated in FIG. 1) includes a panel 1062, a hologram device 1064, and a projector 1066. The panel 1062 may be, for example, a Liquid Crystal Display (LCD) or an Active Matrix Organic Light Emitting Diode (AM-OLED). The panel 1062 may be implemented to be, for example, flexible, transparent, or wearable. The panel 1062 may be configured by the touch panel 1052 and one module. The hologram device 1064 shows a stereoscopic image in the air by using interference of light. The projector 1066 projects light on a screen to display an image. For example, the screen may be located inside or outside the electronic device 1000. According to an embodiment of the present disclosure, the display module 1060 may further include a control circuit for controlling the panel 1062, the hologram device 1064, and the projector 1066.

The interface 1070 includes, for example, an HDMI 1072, a USB 1074, an optical interface 1076, and a D-subminiature (D-sub) 1078. The interface 1070 may be included in, for example, the communication interface 160, as illustrated in FIG. 1. Additionally or alternatively, the interface 1070 may include, for example, a Mobile High-definition Link (MHL) interface, an SD card/Multi-Media Card (MMC), or an Infrared Data Association (IrDA) standard interface.

The audio module 1080 bi-directionally converts a sound and an electronic signal. At least some components of the audio module 1080 may be included in, for example, the input/output interface 140, as illustrated in FIG. 1. The audio module 1080 processes sound information input or output through, for example, a speaker 1082, a receiver 1084, an earphone 1086, the microphone 1088 or the like.

The camera module 1091 is a device which can photograph a still image and a video. According to an embodiment of the present disclosure, the camera module 1091 may include one or more image sensors (for example, a front sensor or a back sensor), an Image Signal Processor (ISP) (not shown) or a flash (for example, an LED or xenon lamp).

The power managing module 1095 manages power of the electronic device 1000. Although not illustrated, the power managing module 1095 may include, for example, a Power Management Integrated Circuit (PMIC), a charger IC, or a battery or fuel gauge. The PMIC may be mounted to, for example, an integrated circuit or an SoC semiconductor. A charging method may be divided into wired and wireless methods. The charger IC charges a battery and prevent over voltage or over current from flowing from a charger. According to an embodiment of the present disclosure, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 1096, or a voltage, a current, or a temperature during charging. The battery 1096 may store or generate electricity and supply power to the electronic device 1000 by using the stored or generated electricity. The battery 1096 may include a rechargeable battery or a solar battery.

The indicator 1097 shows particular statuses of the electronic device 1000 or a part (for example, AP 1010) of the electronic device 901, for example, a booting status, a message status, a charging status and the like. The motor 1098 converts an electrical signal to a mechanical vibration.

Although not illustrated, the electronic device 1000 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined. According to various embodiments of the present disclosure, the electronic apparatus may display different control menus according to the hand-held positions of the electronic apparatus or the touch positions on the touch screen provided in the electronic apparatus.

According to various embodiments of the present disclosure, the electronic apparatus may display the left-hand mode control menu or the right-hand mode control menu according to the properties of the content, so user convenience may be enhanced.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a sensor module configured to detect sensor data;
a touch screen configured to display a control menu related to content that is displayed and receive a touch input; and
a control module configured to:
determine a hand-held position of the electronic apparatus, based on the sensor data;
determine whether a touch position of the touch input belongs to a left area or a right area with respect to a central line of the touch screen; and
in response to determination that the hand-held position belongs to a different area from the determined area of the touch position, assign a priority to the hand-held position and the touch position, configure the control menu according to the priority, based on the determined hand-held position and the touch position, and control to display the configured control menu according to the priority, based on the determined hand-held position and the touch position.

2. The electronic apparatus of claim 1, wherein the sensor module is at least one of a gyro-sensor, an acceleration sensor, a humidity sensor, a temperature sensor, a proximity sensor, an infrared sensor, an illuminance sensor, an image sensor, and an earth magnetic field sensor.

3. The electronic apparatus of claim 1,
wherein, in response to determination that the position according the priority corresponds to a left hand, the control module is further configured to configure a left-hand mode control menu, and
wherein, in response to determination that the position according the priority corresponds to a right hand, the control module is further configured to configure a right-hand mode control menu.

4. The electronic apparatus of claim 1, wherein the control module is further configured to:
control to configure a display area, where the configured control menu is to be displayed, to be centered in the touch position; and
when a portion of the display area is included in a bezel area that surrounds a viewing area of the touch screen, display a portion of the configured control menu, which is included in the viewing area, on the touch screen.

5. The electronic apparatus of claim 1, wherein the control module is further configured to:
control to change a size of the configured control menu, based on a size of the touch input; and
display a size-changed control menu on the touch screen.

6. The electronic apparatus of claim 1, wherein, when a touch input on the configured control menu moves to a bezel area that surrounds a viewing area of the touch screen, the control module is further configured to control to remove the configured control menu from the viewing area.

7. The electronic apparatus of claim 6, wherein the control module is further configured to control to display another control menu related to the content after removing the configured control menu.

8. The electronic apparatus of claim 1, wherein the content that is displayed is one of text data, audio data, and video data, such that items of the control menu are configured based on whether the displayed content is one of the text data, the audio data, and the video data.

9. A method for providing a user interface in an electronic apparatus including a touch screen, the method comprising:
   detecting, by the electronic apparatus, sensor data using a sensor;
   receiving a touch input on a touch screen;
   determining a hand-held position of the electronic apparatus, based on the sensor data;
   determining whether a touch position of the touch input belongs to a left area or a right area with respect to a central line of the touch screen; and
   in response to determination that the hand-held position belongs to a different area from the determined area of the touch position, assigning a priority to the hand-held position and the touch position, configuring a control menu related to content displayed on the touch screen according to the priority, based on the determined hand-held position and the touch position, and displaying the configured control menu according to the priority, based on the determined hand-held position and the touch position.

10. The method of claim 9, wherein the detecting of the sensor data comprises detecting the sensor data using at least one of a gyro-sensor, an acceleration sensor, a humidity sensor, a temperature sensor, a proximity sensor, an infrared sensor, an illuminance sensor, an image sensor, and an earth magnetic field sensor.

11. The method of claim 9, wherein the configuring of the control menu comprises:
   in response to determination that the position according to the priority corresponds to a left hand, configuring a left-hand mode control menu; and
   in response to determination that the position according to the priority corresponds to a right hand, configuring a right-hand mode control menu.

12. The method of claim 9, wherein the displaying of the one of the left-hand mode control menu and the right-hand mode control menu at the determined touch position comprises:
   configuring a display area, where the configured control menu is to be displayed, to be centered in the touch position; and
   when a portion of the display area is included in a bezel area that surrounds a viewing area of the touch screen, displaying a portion of the configured control menu, which is included in the viewing area, on the touch screen.

13. The method of claim 9, wherein the displaying of the one of the left-hand mode control menu and the right-hand mode control menu at the determined touch position comprises:
   changing a size of the configured control menu, based on a size of the touch input; and
   displaying a size-changed control menu on the touch screen.

14. The method of claim 9, further comprising, when a touch input on the configured control menu moves to a bezel area that surrounds a viewing area of the touch screen, removing the configured control menu from the viewing area.

15. The method of claim 14, further comprising displaying another control menu related to the content displayed on the touch screen after removing the configured control menu.

* * * * *